Feb. 20, 1934.　　　　　A. E. BLONDEL　　　1,948,253
DEVICE FOR SOUNDING PURPOSES AND FOR MEASUREMENTS OF DISTANCE BY THE
REFLECTED SOUND OF A SUBMARINE SIGNAL RECEIVED ON SHIPBOARD
Original Filed Jan. 18. 1922　　2 Sheets-Sheet 1
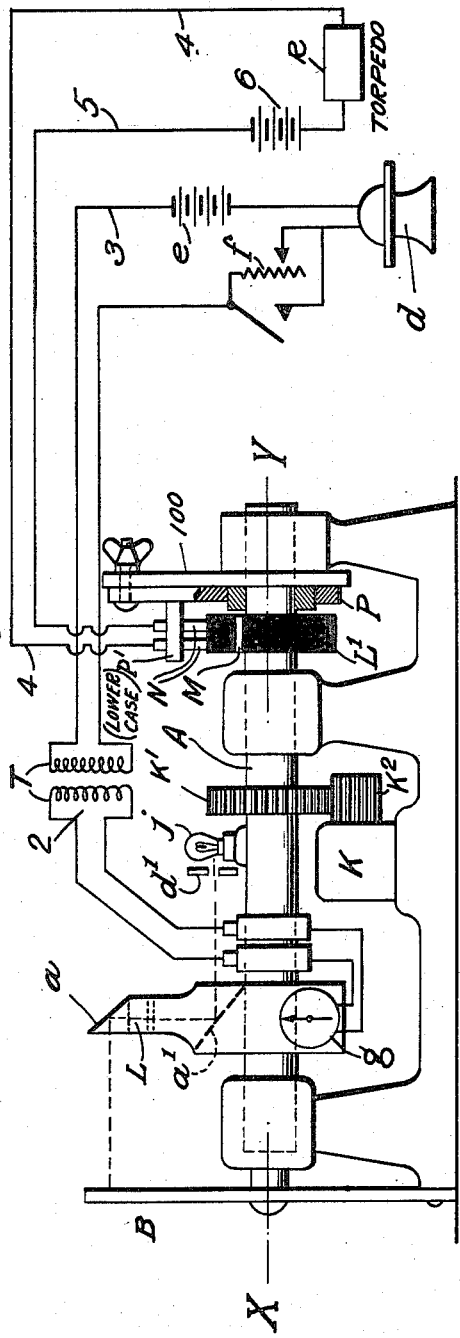
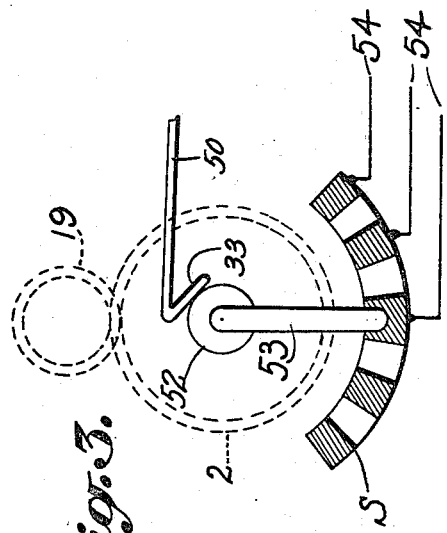
Inventor.
ANDRE EUGENE BLONDEL
By Haseltine, Lake & Co.
Attorneys

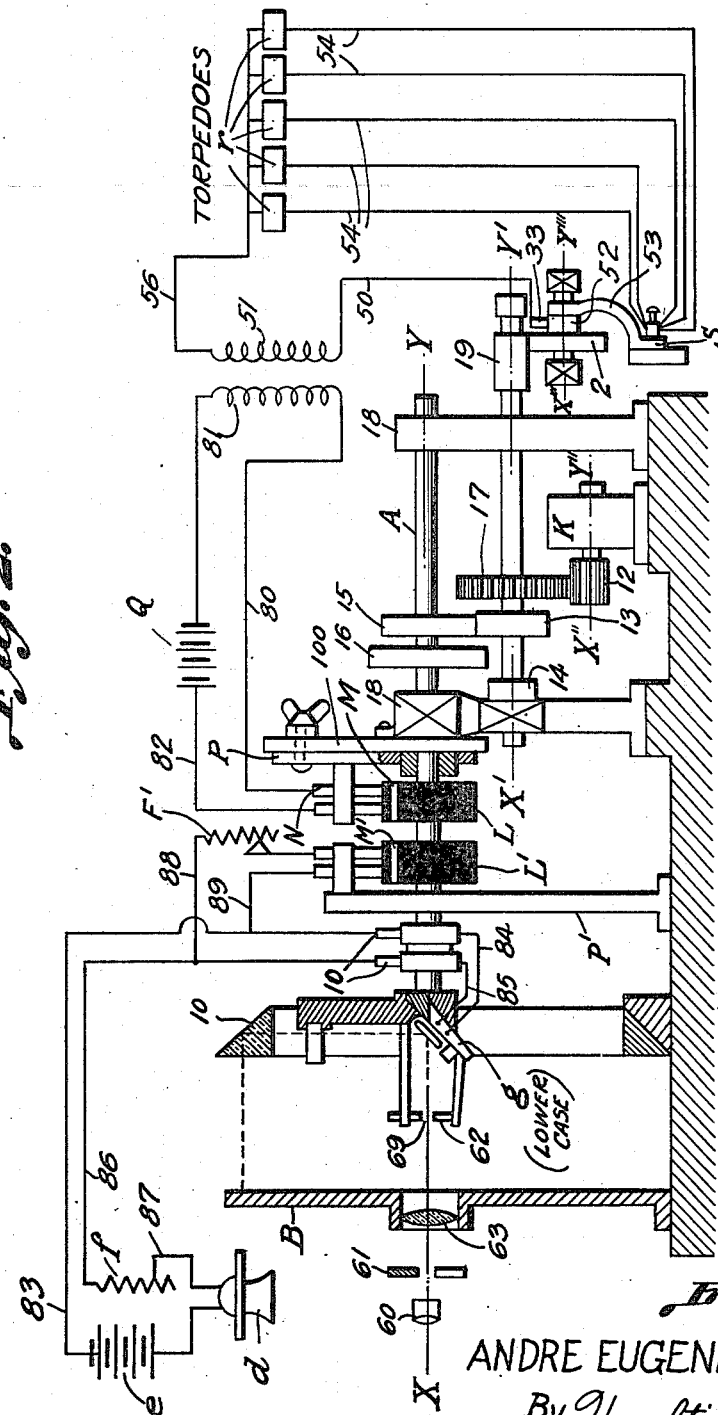

Patented Feb. 20, 1934

1,948,253

UNITED STATES PATENT OFFICE 1,948,253

DEVICE FOR SOUNDING PURPOSES AND FOR MEASUREMENTS OF DISTANCE BY THE REFLECTED SOUND OF A SUBMARINE SIGNAL RECEIVED ON SHIPBOARD

André Eugène Blondel, Paris, France

Original application January 18, 1922, Serial No. 530,146, now abandoned, and in Germany June 27, 1921. Divided and this application May 3, 1928. Serial No. 274,862

10 Claims. (Cl. 177—386)

This application is divided from my prior application Serial Number 530,146, filed January 18, 1922, but now abandoned, and relates to distance measuring apparatus of the class in which the time elapsing between the emission of a sound and the reception of the echo caused by its reflection from the object whereof the distance is to be measured, is determined by observing the angle traversed by an element moving at a constant known speed. Apparatus of this class is employed for measuring the depth of the sea and other bodies of water, the distance of mountains, icebergs, and other objects capable of reflecting sound, from an observing station.

My present invention has for an object to provide an apparatus of this class more particularly suitable in the case of sounding operations carried out in comparatively shallow situations.

The invention employs the observation of two signals, whereof one corresponds to the starting shock and the other to the return shock, and the method of coincidences as applied to these two signals. The invention comprises the use of luminous signals and of a device for the emission of sounds, for example the explosion of cartridges or torpedoes by means of a mechanism connected with the movement of a device serving for the comparison of the signals. The invention also comprises a modified form of the preceding device wherein the sound producing element consists of a vibrating body instead of cartridges or torpedoes. Other objects of the invention will be set forth in a more explicit manner in the following description.

The accompanying drawings which are given by way of example set forth various embodiments of my invention wherein:—

Fig. 1 is a longitudinal section, more or less diagrammatic, of one form of the invention.

Figure 2 is a similar view of a modified form of the arrangement shown in Figure 1.

Figure 3 is a detail view of a device for varying the instant of the emission of the starting shock or signal.

Figure 4 is a detail view of a portion of Figure 2 showing the manner in which the brush holders may be shifted upon a scale.

In Figure 1 is represented one form of the invention wherein a total reflection prism mirror $a$ is mounted upon an arm L rigidly carried by a shaft A and is revoluble in a plane perpendicular to the axis X—Y of the shaft A which is rotated by a constant speed motor K. A stationary screen B of an opaque or translucent character is perpendicular to the axis X—Y and receives from the mirror $a$ the rays reflected upon the latter by a second mirror $a^1$ actuated by a galvanometer $g$ which forms part of the receiving apparatus and is itself actuated through the secondary circuit 2 of a transformer T by the current supplied to the primary circuit 3 of said transformer by a battery $e$, a microphone $d$ and a rheostat $f$ being inserted in said primary circuit 3.

The constant speed motor K which drives the shaft A of the mirror $a$ may be of the clockwork type, or an electric motor operating at a speed maintained constant by any known means.

The galvanometer $g$ is secured to the revoluble shaft A and the mirror $a^1$ actuated thereby oscillates about an axis perpendicular to the axis X—Y and is also inclined at about 45° in order to reflect upon the mirror $a$ the rays proceeding from the center of the filament of an incandescent lamp $j$ which is also mounted upon the revoluble shaft A. The normal position of the mirror $a^1$ is such that it will not reflect light from the lamp $j$ on to the screen B through the mirror $a$. An apertured diaphragm $d^1$ limits the central part of the lamp filament constituting the luminous point; and the latter part, the center of the mirror $a^1$ and the center of the mirror $a$ are all disposed in the same plane of the figure which, as shown, passes through the axis X—Y and is revoluble thereupon.

The galvanometer $g$ may be one of a usual type and is illustrated by the usual diagrammatic symbol, and it may actuate the mirror $a^1$ in any convenient manner as will readily be appreciated by those skilled in the art. The galvanometer may be the diaphragm of a telephone receiver having the mirror secured thereto at a certain distance from the center, according to Frohlich's method i. e., so that, upon the movement of said diaphragm, the mirror is simultaneously moved in such fashion that the light falling thereon is flung out and acts as a pointer in the manner of the mirror galvanometer. As stated above, associated with the galvanometer is the microphone $d$ of any known type, supplied with current by the battery $e$, through the circuit 3 which also contains the regulating rheostat $f$, whereby the A. C. voltage is conducted to the coils of the galvanometer $g$ through the transformer T.

The shaft A is driven by the motor K through a pair of pinions $K^1$, $K^2$ and rigidly carries a disc or drum $L^1$ of insulating material having a transverse contact segment M let into its periphery. A stationary L-shaped arm P is provided with a pair of brushes N which engage the periphery of the drum $L^1$ and upon contacting with the contact segment M close an ignition circuit 4, 5 supplied with current by a battery 6 for firing a torpedo or cartridge R to produce a starting signal.

The shocks produced in the water by the firing of a torpedo will cause a sudden variation of current in the galvanometer thereby rotating the mirror $a^1$ which through the mirror $a$ reflects a spot of light upon the screen B the position of which is noted. Upon the return of the echo or sound waves reflected from the sea bottom or other object to the device, another variation of the galvanometer current takes place and a second spot of light is reflected upon the screen.

A modified form of the invention is shown in Figure 2 in which the revoluble mirror is replaced by a stationary ring-shaped mirror $a$ having a conical reflecting surface with reference to the axis X—Y. The only revoluble elements in this case are the mirror $a^1$ and the galvanometer $g$, the incandescent lamp $j$ being replaced as shown by a fixed source of light, for instance an arc lamp 60 sending a beam through the aperture of a diaphragm 61 upon a lens 63 situated a suitable distance away and in the axis A of the apparatus. With the shaft X—Y is revoluble an opaque screen 62 having therein as shown an aperture or slit 69 disposed in the axis X—Y and—in the case of a slit—perpendicular to the plane of reflection (passing through 62, $a^1$, $a$,) of the rays falling upon the revoluble mirror $a^1$ actuated by the galvanometer $g$. As before, the latter may be of any suitable type and is illustrated by the usual diagrammatic symbol, while the mirror $a^1$ may be mounted in any convenient manner for actuation by the galvanometer to produce the rapid movement thereof under the action of a microphone current. The lens 63 with generatrices parallel to the plane X—Y $a^1$, $a$, will concentrate the rays from $a^1$ at a point upon the screen B. The galvanometer $g$ will receive the current from the microphone $d$ by means of the friction contact members 10 which are insulated from the revoluble shaft A. The normal position of the mirror $a^1$ is such that it does not reflect light on to the screen B.

Figure 2 also illustrates various accessory devices actuated by the motor or by one of several auxiliary shafts X'—Y', X''—Y'', X'''—Y'''. In the first place, the arrangement comprises a revoluble lever 53 for sending the current through the ignition circuit to the torpedoes, the said lever being rotated with the shaft X'''—Y''' by a gear wheel 2 engaging a pinion 19 mounted upon the countershaft X'—Y'. The explosion circuit is represented by 50, 51, 56, $r$, 54, S, 53, 52, 33, in which 51 represents the secondary of a step-up transformer whose primary 81 is energized by a battery Q; 52 is a metal cylinder which is electrically insulated and is revoluble with the shaft X'''—Y''', it being connected to the circuit by a friction contact 33. To the cylinder 52 is secured the lever 53 passing over the various contact segments S (Fig. 3) mounted upon an insulating base, each segment being connected to a separate wire 54 terminating at a cartridge or torpedo $r$. The wire 56 may be common to a plurality of torpedoes each having a separate return wire 54, and in this manner when the member 52 is rotated upon by the wheel 2, the axis X'''—Y''' the lever 53 will cause the current to pass in succession into the various torpedoes to explode the same.

The contact segments S are so disposed that each contact piece cooperates with the lever arm 53 after a stated and constant number of revolutions of the shaft A and contact will be made at each contact S in succession.

Now, in order to fire a cartridge, it is, of course, necessary for arm or brush 53 to be in contact with the particular contact S corresponding with the cartridge to be exploded at the same time that brushes N engage contact M. But inasmuch as arm or brush 53 moves rather slowly, it remains in contact with the segment S for a relatively long time, while on the other hand, contact M moves relatively fast so that it makes only momentary contact with brushes N.

Contact M thus governs the actual time of firing the torpedo by effectively closing its circuit while arm 53 closes and maintains its circuit closed. The time at which M momentarily closes its circuit can be varied within comparatively wide limits and still be effective in closing its circuit while arm 53 yet remains in contact with the contact segment S and closes the circuit corresponding therewith.

To relieve the galvanometer of sudden impulses produced by the starting wave and to preserve great sensitiveness for the reflected wave, the shaft A may also have mounted thereon an insulating cylinder $L^1$ similar to the cylinder L and provided in like manner with a conducting segment $M^1$ cooperating with a pair of brushes $N^1$ carried by a stationary holder $P^1$ and which form part of a circuit 88, 89 connected in shunt on the galvanometer $g$ and containing a regulating rheostat $F^1$. By shifting the disk $L^1$ about the shaft A in such manner that the brushes $N^1$ are cross-connected by the segment $M^1$ at the moment of firing the torpedo and if the segment $M^1$ is wide enough, the galvanometer $g$ will then be shunted by the resistance $F^1$ during the action of the explosion or of the sound of a bell, and by a suitable adjustment of $F^1$, the observer may reduce at will the sudden and strong current sent at this moment into the galvanometer and may even reduce it to zero by giving the resistance $F^1$ a zero value.

Describing now the operation of the apparatus in Fig. 2, as soon as the motor K starts up, the drum L and the arm 53 are rotated so that the contact segment M engages the brushes N simultaneously with the engagement of the arm 53 with one of the segments S. The effect of this is first of all to complete a primary circuit as follows: First brush N, lead 80, primary coil 81 of step-up transformer, battery Q, lead 82, second brush N, and contact segment M. Upon completion of this circuit there is caused a current impulse which induces a current in the secondary coil 51 of the step-up transformer, which induced current passes through the closed secondary circuit as follows: Coil 51, lead 56, one torpedo $r$, the corresponding lead 54 and contact segment S arm 53, drum 52 wipe contact 33, lead 50. The completion of the last circuit fires the selected torpedo $r$ and the shocks thus produced in the water cause a sudden variation of current in the galvanometer $g$ through the action of the detonation upon the microphone $d$. This sudden variation of current in the galvanometer circuit causes a deflection of the galvanometer needle and a consequent deflection of the mirror $a^1$ into a position so that it reflects light from the arc 60 and causes a flash to appear upon the screen B, the position of which is noted. The galvanometer circuit is as follows: Microphone $d$, battery $e$, lead 83, first contact 10, lead 84, galvanometer $g$, lead 85, second contact 10, lead 86, rheostat $f$, lead 87. Owing to the shunt circuit comprising lead 88, rheostat F¹, first brush N¹, contact M¹, second brush N¹, lead 89, sudden impulses upon the galvanometer are relieved or reduced to zero. The gear reductions 15, 13 between the shafts A and X'—Y' and 19, 2 between said latter and the shaft X'''—Y''', carrying the arm 53, are such that, after completion of a determined number of turns of the shaft A, when the contact M meets again the brushes N, said arm 53 is then shifted angularly into a position in which it makes contact with the following segment S, which permits of the firing of a subsequent torpedo. In either of the embodiments shown in Figures 1 or 2, instead of reading the distance to be measured directly upon a scale by means of the relative positions of two flashes thereon produced respectively by each of the emitted sounds and their echoes, the method of coincidence may be applied to the emission of two subsequent audible signals for this purpose. To effect this, use is made of an angularly adjustable brush-holder P and of means (not shown) permitting the measurement of said angular adjustment. The operation is then as follows: A first torpedo is first fired by means of the ignition circuit as stated above and the position of the luminous flash produced thereby upon the screen B is noted. The position of the brush-holder P is then moved angularly so that the flash produced by the echo of a subsequent torpedo, through the medium of its effect upon the microphone $d$, is coincident upon the screen with the flash produced by the firing of the first torpedo. The angular distance travelled by the angularly adjustable brush-holder P to effect this coincidence is then measured on the graduated scale 100 as a function of the distance away of the object producing the echo or reflected sound or signal.

Figure 2 shows also an arrangement wherein the constant reduction gearing 15, 13 and 17, 12 between the motor K and the revoluble shaft A may be replaced by a change-speed gear set operated by the simple movement of a lever (not shown) as in the case of motor vehicles in order to provide for two or three different speeds, and in this manner the operator can vary the sensitiveness of the observation according to the depth of the sea. It will be advisable for instance to use a speed of rotation for the mirrors such that the reflected wave shall accomplish one revolution per second in the case of measurements at depths reaching 1500 meters; if the diameter of the circle projected on the screen is 477 millimeters, the spot of light will describe a circle of 1500 millimeters per second in the disposition Figure 1. In this case 1 meter depth in the sea will correspond to 1 millimeter upon the screen. For smaller depths, the speed of rotation may be increased, using for instance the speed of three revolutions per second for depths of 500 meters, thus affording 1 meter per 3 millimeters on the screen, and a speed of 10 revolutions per second for depths of 150 meters, representing 1 meter for 1 centimeter on the screen. This change-speed arrangement is constituted by an alternative reduction gear 16, 14, which may be put in mesh to connect the shafts A and X'—Y', instead of the gear 15, 13, by shifting the shaft X'—Y' which is susceptible of a lengthwise movement. The pinions 12 and 19 are made wide enough to remain engaged with the wheels 17 and 2 respectively while the gear wheels 13, 15 will be disengaged and the wheels 14, 16 engaged.

The arrangement as hereinbefore described may be completed by the addition of various accessory devices used in current practice. For instance, the currents proceeding from the microphones may be amplified by means of telephone relays or amplifying devices of thermionic valve type as employed in telephony or in radio-telegraphy, thereby increasing the deflections of the galvanometer. The ordinary microphone may be replaced by an electrostatic microphone, and various devices of a like nature may be employed.

Having now particularly described and ascertained the nature of my said invention and the manner in which the same is to be performed, I declare, that what I claim is:

1. Distance measuring apparatus of the class described comprising in combination, sound emitting means, a timing device causing repetition of the emitted sounds at uniform intervals, a circular translucent scale, and means for producing luminous flashes upon said scale to indicate both the emitted sounds and their echoes, an adjustable member associated with the timing device for permitting detections of said sounds and echos at coincident phases of the operation of the timing device thereby causing the luminous flashes produced by the emitted sounds and their echos to coincide on the scale, means for indicating and measuring the angular displacement of the adjustable member to produce such phase coincidence as a function of the distance to be measured.

2. Distance measuring apparatus of the class described comprising in combination a sound emitter, a timing device causing repetition of the emitted sounds at uniform intervals, a circular translucent scale, a shaft rotating at constant speed, a galvanometer carried by said shaft, a microphone actuated by the emitted sounds and their echos thereby causing the galvanometer to throw luminous indicator flashes upon the scale thereby detecting the sounds and echos, an adjustable member associated with the timing device for permitting detections of said sounds and echos at coincident phases of the operation of the timing device thereby causing the luminous flashes produced by the emitted sounds and their echos to coincide on the scale, means for indicating and measuring the angular displacement of the adjustable member to produce such phase coincidence as a function of the distance to be measured.

3. Distance measuring apparatus of the class described comprising in combination an electrical circuit for producing emitted sounds, a timing device in said circuit for producing said sounds at uniform intervals, a receiver circuit including a microphone and a galvanometer for detecting the emitted sounds and their echos, a circular translucent scale, means operated by said galvanometer for projecting luminous flashes upon said scale to indicate the emitted sounds and their echos, an adjustable member associated with the timing device for permitting detections of said sounds and echos at coincident phases of the operation of the timing device thereby causing the luminous flashes produced by emitted sounds and their echos to coincide on the scale, means for indicating and measuring the angular displacement of the adjustable member to produce such phase coincidence as a function of the distance to be measured.

4. Distance measuring apparatus of the class described comprising in combination an electrical circuit for producing emitted sounds, a timing device in said circuit for producing said sounds at uniform intervals, a receiving circuit including a microphone and a galvanometer for detecting the emitted sounds and their echos, a circular translucent scale, a constant speed member upon which said galvanometer is mounted, a mirror oscillated by said galvanometer about an axis perpendicular to that of said constant speed member to project luminous flashes upon said scale to indicate the emitted sounds and their echos, an adjustable member associated with the timing device for permitting detections of said sounds and echos at coincident phases of the operation of the timing device thereby causing the luminous flashes produced by the emitted sounds and their echos to coincide on the scale, means for indicating and measuring the angular displacement of the adjustable member to produce such phase coincidence as a function of the distance to be measured.

5. Distance measuring apparatus of the class described comprising in combination a sound emitter, a timing device causing repetition of the emitted sounds at uniform intervals, a circular translucent scale, a shaft rotating at constant speed, a galvanometer carried by said shaft, a shunt circuit for relieving the galvanometer of sudden impulses produced by the sound emitter, a microphone actuated by the emitted sounds and their echos thereby causing the oscillograph to throw luminous indicator flashes upon the scale thereby detecting the sounds and echos, an adjustable member associated with the timing device for permitting detections of said sounds and echos at coincident phases of the operation of the timing device thereby causing the luminous flashes produced by the emitted sounds and their echos to coincide on the scale, means for indicating and measuring the angular displacement of the adjustable member to produce such phase coincidence as a function of the distance to be measured.

6. Distance measuring apparatus of the class described comprising in combination an electrical circuit for producing emitted sounds, a timing device in said circuit for producing said sounds at uniform intervals, a receiver circuit including a microphone and a galvanometer for detecting the emitted sounds and their echos, a shunt circuit for relieving the galvanometer of sudden impulses produced by the sound emitter, a circular translucent scale, means operated by said galvanometer for projecting luminous flashes upon said scale to indicate the emitted sounds and their echos, an adjustable member associated with the timing device for permitting detections of said sounds and echos at coincident phases of the operation of the timing device thereby causing the luminous flashes produced by emitted sounds and their echos to coincide on the scale, means for indicating and measuring the angular displacement of the adjustable member to produce such phase coincidence as a function of the distance to be measured.

7. Distance measuring apparatus of the class described comprising in combination an electrical circuit for producing emitted sounds, a timing device in said circuit for producing said sounds at uniform intervals, a receiving circuit including a microphone and a galvanometer for detecting the emitted sounds and their echos, a shunt circuit for relieving the galvanometer of sudden impulses produced by the sound emitter, a circular translucent scale, a constant speed member upon which said galvanometer is mounted, a mirror oscillated by said galvanometer about an axis perpendicular to that of said constant speed member to project luminous flashes upon said scale to indicate the emitted sounds and their echos, an adjustable member associated with the timing device for permitting detections of said sounds and echos at coincident phases of the operation of the timing device thereby causing the luminous flashes produced by the emitted sounds and their echos to coincide on the scale, means for indicating and measuring the angular displacement of the adjustable member to produce such phase coincidence as a function of the distance to be measured.

8. Distance measuring apparatus of the class described comprising in combination a sound emitter, a timing device causing repetition of the emitted sounds at uniform intervals, a circular translucent scale, a shaft rotating at constant speed, a mirror in the form of a total reflection prism, a galvanometer carried by said shaft, a microphone actuated by the emitted sounds and their echos thereby causing the galvanometer to throw luminous indicator flashes upon the scale thereby detecting the sounds and echos, an adjustable member associated with the timing device for permitting detections of said sounds and echos at coincident phases of the operation of the timing device thereby causing the luminous flashes produced by the emitted sounds and their echos to coincide on the scale, means for indicating and measuring the angular displacement of the adjustable member to produce such phase coincidence as a function of the distance to be measured.

9. Distance measuring apparatus of the class described comprising in combination a sound emitter, a timing device causing repetition of the emitted sounds at uniform intervals, a circular translucent scale, a shaft rotating at constant speed, a mirror in the form of a total reflection prism, a galvanometer carried by said shaft, a source of light, a second mirror revolvable with said shaft and oscillatable by means of the galvanometer about an axis perpendicular to that of the shaft, a microphone actuated by the emitted sounds and their echos thereby causing the galvanometer to throw luminous indicator flashes upon the scale thereby detecting the sounds and echos, an adjustable member associated with the timing device for permitting detections of said sounds and echos at coincident phases of the operation of the timing device thereby causing the luminous flashes produced by the emitted sounds and their echos to coincide on the scale, means for indicating and measuring the angular displacement of the adjustable member to produce such phase coincidence as a function of the distance to be measured.

10. Distance measuring apparatus of the class described comprising in combination an electrical circuit for producing emitted sounds, a timing device in said circuit for producing said sounds at uniform intervals, a receiver circuit including a microphone and a galvanometer for detecting the emitted sounds and their echos, a circular translucent scale, a mirror in the form of a total reflection prism, a source of light, a mirror revolvable with said shaft and oscillatable by means of the galvanometer about an axis perpendicular to that of the shaft for projecting luminous flashes upon said scale to indicate the emitted sounds and their echos, an adjustable member associated with the timing device for permitting detections of said sounds and echos at coincident phases of the operation of the timing device thereby causing the luminous flashes produced by emitted sounds and their echos to coincide on the scale, means for indicating and measuring the angular displacement of the adjustable member to produce such phase coincidence as a function of the distance to be measured.

ANDRÉ EUGÈNE BLONDEL.